(12) United States Patent
Ochoa

(10) Patent No.: US 7,775,249 B2
(45) Date of Patent: Aug. 17, 2010

(54) TIRE STAND

(75) Inventor: Sandy Ochoa, Alamogordo, NM (US)

(73) Assignee: Ochoa Brothers, Inc., Alamogordo, NM (US)

( * ) Notice: Subject to any disclaimer, the term of this patent is extended or adjusted under 35 U.S.C. 154(b) by 19 days.

(21) Appl. No.: 12/023,569

(22) Filed: Jan. 31, 2008

(65) Prior Publication Data

US 2009/0194239 A1    Aug. 6, 2009

(51) Int. Cl.
*B60C 25/01* (2006.01)
*B60B 30/00* (2006.01)

(52) U.S. Cl. .......................... 157/1.1; 157/14

(58) Field of Classification Search ............... 157/1.1, 157/1, 5, 7, 14, 19–21; 414/428–430
See application file for complete search history.

(56) References Cited

U.S. PATENT DOCUMENTS

| | | | | |
|---|---|---|---|---|
| 2,447,435 A | * | 8/1948 | Settle | 414/428 |
| 2,483,908 A | * | 10/1949 | Jackson | 414/428 |
| 3,677,320 A | * | 7/1972 | Corless | 157/1.1 |
| 3,850,321 A | * | 11/1974 | Virnig | 414/428 |
| 4,465,421 A | * | 8/1984 | Murillo | 414/430 |
| 5,060,708 A | | 10/1991 | Hansen | |
| 5,219,012 A | | 6/1993 | Corghi | |
| 5,247,982 A | * | 9/1993 | Miller | 157/1.1 |
| 5,356,163 A | * | 10/1994 | Suggs, Sr. | 280/47.27 |
| 5,649,582 A | | 7/1997 | Hjorth-Hansen | |
| 7,225,849 B2 | | 6/2007 | Routt et al. | |
| 7,431,314 B2 | * | 10/2008 | Donaldson | 280/47.27 |

* cited by examiner

*Primary Examiner*—Hadi Shakeri
(74) *Attorney, Agent, or Firm*—Dennis F. Armijo

(57) ABSTRACT

A method and apparatus for centering a tire on a wheel for concentrically mounting the tire on the wheel. The tire and wheel assembly are placed on an arched member which gravitationally centers assembly on the arched member. Further, the arched member is also a rest for the tire sidewall to seal the bead of the tire on the wheel. A tire stand for handling, positioning and assisting in seating a bead is also provided. The tire stand also has an arched member to center the tire on the wheel. Two forks cradle a vertically positioned tire to initially position the tire and wheel assembly over the arched member. The tire stand is configured to be tilted to a horizontal position with the tire and wheel assembly inserted, thereby centering the assembly on the arched member. A beading device can then be activated to the concentric tire and wheel assembly.

12 Claims, 6 Drawing Sheets

TIRE STAND

BACKGROUND OF THE INVENTION

1. Field of the Invention (Technical Field)

The present invention generally relates to tire mounting and more particularly to a method and apparatus for handling, positioning, and assisting in seating the bead on tires, especially tubeless truck and tractor tires.

2. Background Art

There are several variations of tire changing stands available on the market. They range from the adjustable variety to those of a fixed position type, which elevates the tire for working on it in a shop environment.

There are a number of inherent limitations and shortcomings in these prior art devices relating to the tire inflation process, especially to seating the bead of the mounted tire. These limitations are associated with the inability of these prior art tire changing stands while handling the tire and wheel, centering the tire on the wheel, supporting the sidewalls of the tire in the bead seating process, and to ensure a non-eccentric mounting of the bead. Further, these prior art devices are strictly limited to a very limited range of wheel and tire sizes and Wheel types. These limitations are a result of the general construction of the prior art devices. For instance, both adjustable and fixed tire changing stands, generally have two adjustable semi-circular supports (adjustable) or a fixed sized ring (fixed), elevated over a supporting base. These prior art tire changing devices have no means of handling the tire with a minimum of strain to the user when laying the tire in the horizontal working position or when raising the tire back to a vertical rolling position. The tire is generally dropped onto the elevated stand and then manually lifted off the said stand when finished. Further, these devices require the user to manually center the tire on the rim for beading the tire. These devices do not self-center the tire because they are laid on a flat plane on which the tire rests. This flat plane construction supports only the wheel and provides no support to the tire sidewalls, which can assist in seating the bead on tubeless tires. Due to these failures in the prior art devices, eccentric mounting of the tire on a wheel generally occurs, requiring remounting of the tire. Finally, these tire changing stands limit the range of tires and types of wheels that may be used, because these fixed tire changing stands offer no adjustment, while the adjustable stand offers only a narrow range of adjustment and require reassembly of the tire changing stand.

SUMMARY OF THE INVENTION (DISCLOSURE OF THE INVENTION)

The present invention provides solutions to the aforementioned shortcomings in the prior art devices. The preferred embodiment provides a passive centering apparatus and method for accurately and repeatedly centering a tire on a wheel for seating the tire bead on the rim and to easily move a wheel assembly from a vertical to a horizontal position.

The preferred embodiment has two extending centering forks running substantially parallel to one another at a suitable distance apart so as to facilitate a cradling of the curvature of the tire face when it is in the upright vertical rolling position. The two forks are equally rounded near the center. This comprises the self-centering feature of the invention so that when a tire is lowered to the horizontal position, gravity acts upon the wheel to center the outer ring of the wheel upon the centering forks disposed on the inflation stand. By using the outer ring for the centering of the wheel, the apparatus can be used for hub type wheels, containing a hole in the center and open type wheels, which may or may not have a hole in the center. This self-centering feature ensures a more even mounting of the tire, thereby eliminating eccentric mounting.

The invention further comprises a frame comprising two elongated members, attached substantially perpendicular to the centering forks. This frame further comprises two cross members, one at either end of the two elongated members. Together these attached elements work in conjunction with one another to establish a structural supporting frame and working plane for the other elements of the invention.

Further attached parallel to the two elongated members are two shallowly arched members, each running substantially parallel to one another. These arches are of a length to facilitate the mounting and inflating of a wide range of wheel and tire sizes. These arches further more have a radius substantial enough to provide enough support to the wheel so as to make a seal on the bottom bead of the tire and wheel assembly when it is in the horizontal position. These arches are also constructed with a shallow enough radius to provide some additional support to the tire side wall thereby closing the gap on the top unsealed portion of the bead and reducing the energy required to properly seal the bead from the top side of the wheel/tire assembly. Once centered on these self-centering forks, the tire will seat more evenly further assisting in a non-eccentric mounting and inflation.

Attached substantially perpendicular to the top cross member of the support frame and substantially positioned near its center is a wrap around handling enclosure. This wrap around handling enclosure is fashioned to confine the tire and wheel assembly in its rolling position substantially parallel with the structural frame and to limit tire movement in the range perpendicular to the rolling plane of the tire and wheel assembly. The handling enclosure comprises a connecting member positioned at a right angle to the top cross member of the support frame near its center, further running parallel to the elongated members of the support frame. Attached to the connecting member of the handling enclosure is the handling enclosure cross member running perpendicular to the plane of the support frame. The handling enclosure cross member is constructed so that a portion of it runs aft of the support frames working plane an appropriate and suitable length, before it reaches the connecting member of the handling enclosure to form a handle, which the user can grip while lowering the tire and wheel assembly part way towards the horizontal position. The handling enclosure cross member continues running a suitable length past the connecting member to a point where a standard tire of nearly any width may fit within its dimensions while being rolled onto the self-centering forks. At this appropriate dimension the cross section portion of the handling enclosure makes a substantially ninety degree (90°) return towards the self centering forks of the invention, thus forming the wrap around element of the enclosure. The partial enclosure ensures that the tire and wheel assembly can be lowered to the horizontal position in concert with the working structure of the invention. The handling enclosure aft section of the cross member also provides a means of repositioning the hand or hands of the user as he lowers the invention to the horizontal position so as to reduce strain on the wrist, arms, or back by means of a secondary griping position. This secondary griping position is near the substantially ninety degree (90°) return of the handling enclosure cross member.

The preferred embodiment also has two fulcrum skids. These fulcrum skids run substantially parallel to one another further running parallel to the elongated members of the support frame and at a right angle to the cross members of the support frame. These fulcrum skids further run to the aft section of the support frame opposite the arched members. The skids are held from the support frame by four extending members of the support frame, two for each skid. These extending members run at a right angle to the plane of the elongated members of the support frame and serve to elevate the tire and wheel assembly in the lowered horizontal position. The fulcrum-skids are further made in-such a way that they run the length of the support frame. Before reaching the forked end of the elongated members of the support frame the skid fulcrums make an approximately forty-five degree (45°) return and is attached at the bottom of support frame on its aft side. This forms the lower portion of the approximately forty-five degree (45°) elevation and fulcrum member of the fulcrum skid. These approximate forty-five degree (45°) returns of the fulcrum skid provide a middle point in moving the tire and wheel assembly from the vertical position to the horizontal position. The movement occurs in stages as the tire and wheel assembly is lowered to rest on the approximately forty-five degree (45°) elevation and fulcrum members of the skid fulcrum. In this position, the user may pause to ensure that an even seating of the bottom bead of the tire and wheel assembly is achieved and to confirm the self centering effect of the forks is in place. He may further reposition his grip on the handling enclosure portion of the invention to reduce arm, wrist, or back strain while letting the tire down to the full horizontal position. This approximately forty-five degree (45°) member also facilitates a leverage point by which the user can more easily lower the tire stand to the full horizontal position while maintaining an appropriate elevated position to seat the bead. In the full horizontal position the tire stand rests on the lengthwise members of the skid fulcrum. The tire and wheel assembly is now in a position for appropriate seating. After non-eccentric bead seating and mounting of the tire has been achieved, the user may then return the tire stand to the upright vertical position with the assistance of the two stage fulcrum skids and remove the mounted tire and wheel assembly from the tire stand to the appropriate safety cage for airing of the tire to the proper PSI (pounds per square inch).

This novel solution provides an easily used and effective non-eccentric mounting and seating of light truck, truck, and tractor tires.

It is the general object of this invention to provide a novel and advanced tire inflation stand and its accompanying methods of use, which solves the abovementioned limitations.

A fundamental object of the invention is to provide a tire inflation stand with a partially confined handling enclosure.

Another object of the invention is to provide a tire inflation stand that is easily raised and lowered to and from the working position by means of an incremental raising and lowering method.

Another object of the invention is to provide a means of self centering the tire and wheel on the inflation stand thereby ensuring non-eccentric mounting by means of two centering members.

Yet another object is to provide a tire inflation stand that elevates the tire and wheel to a suitable working plane.

A further object is to provide a tire inflation stand which has a working plane which supports the wheel as to allow contact with the tires lower bead thus providing an effective seal during bead seating.

A related object is to have a working plane that lends the proper measure of support to the tire sidewall to assist in bead seating by means of shallow arching support members.

Another object is to provide a tire inflation stand that has a widened range of use on both smaller and larger truck and tractor tires regardless of wheel type.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

The present invention generally comprises a unique tire seating and inflation stand, which serves the intended purpose of handling, positioning, and assisting in seating the bead, on tubeless truck and tractor tires.

The present invention provides a skidded platform with a fulcrum point for easy manipulation of the tire and wheel assembly from vertical to the horizontal position. This manipulation is further assisted by a handling enclosure that effectively contains the tire and wheel assembly in the work envelope during the bead mounting process. The tire stand further provides for a gravitational centering system for centering a tire on a wheel for beading the tire on the wheel. The centering system consists of two self-centering forks. Another salient feature of the tire stand is the shallow arched radius members that provide a seal to the bottom bead of the wheel and tire assembly and add support to the sidewalls portions of the tire for effective and uniform mounting of the tire.

Figure 1:
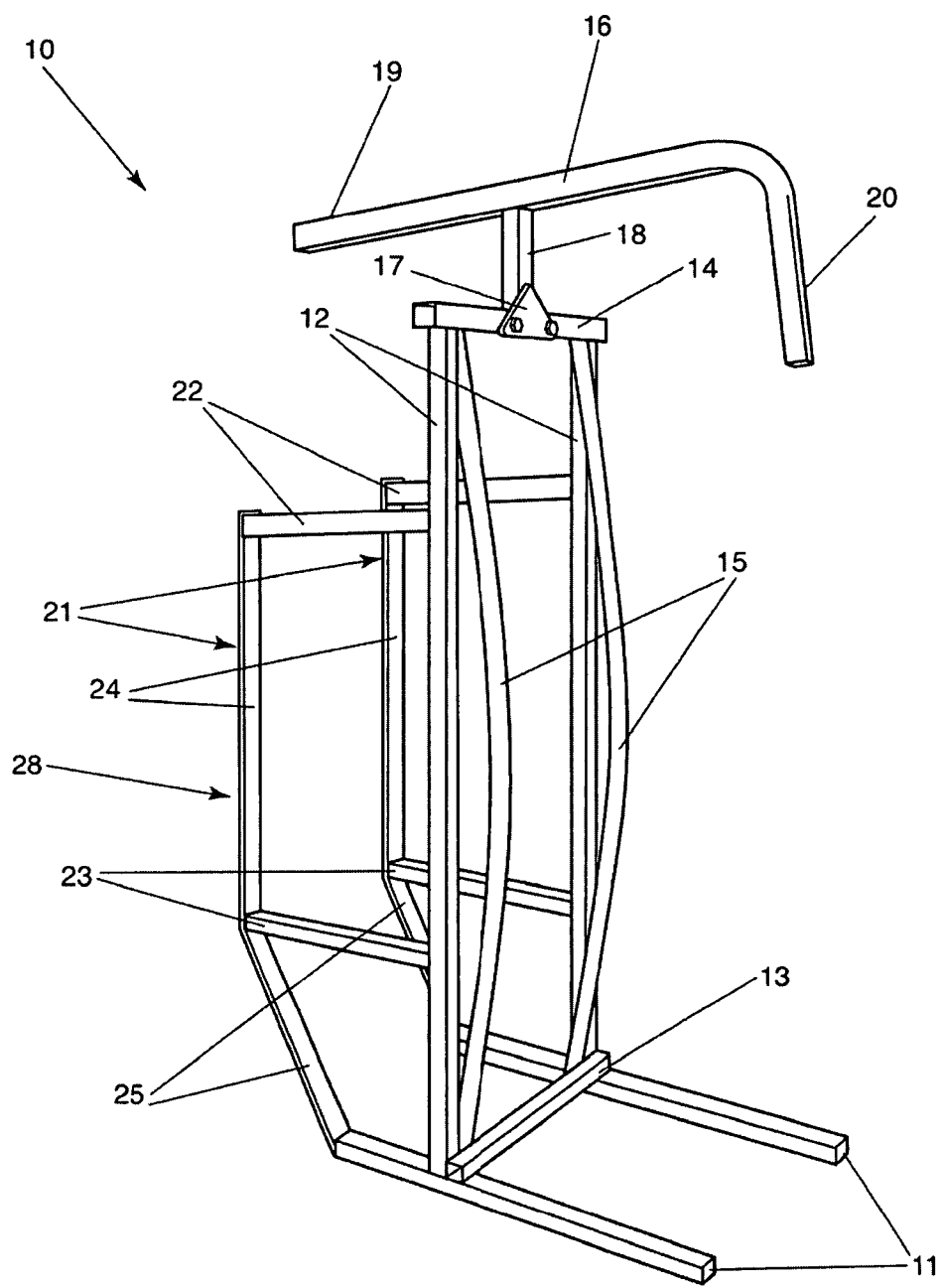
FIG. 1 is a perspective view drawing of the invention in the upright vertical position.
Figure 4:
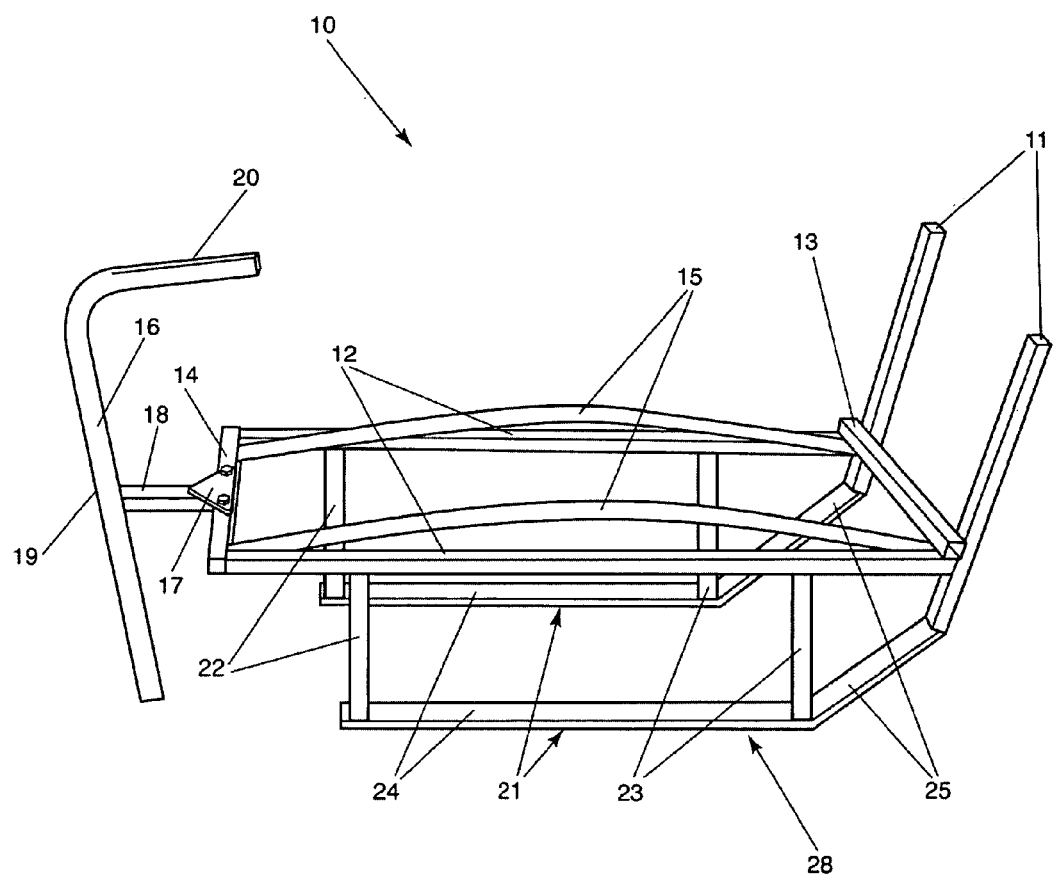
FIG. 4 is a right side view drawing of the invention in the horizontal position.

FIG. 1 and FIG. 4 are perspective views of the preferred tire inflation stand 10. Tire inflation stand 10 comprises two extending fork elements 11 running substantially parallel to one another at a suitable distance apart to facilitate a cradling of the curvature of the tire when it is in the upright vertical rolling position. Attached to two extending fork elements 11 are two elongated elements 12 of support frame 28 attached substantially perpendicular to forks elements 11 also running substantially parallel to one another. Support frame 28 further comprises two cross members 13 and 14, one at either end of two elongated elements 12 of support frame 28, and attached to run substantially perpendicular to these and yet parallel to one another to hold support frame 28 together. Further attached parallel to two elongated elements 12 are two shallowly arched radius members 15 each running parallel to one another. Although, two shallow arched radius members 15 are shown, it is envisioned that other types of arched structures can be used, such as a conical shaped structure or more than two arched members. Any type of structure that can support the rim of a tire assembly while having the tire "float" on the rim is hereby included. Attached substantially perpendicular to top cross member 14 of support frame 28 and substantially positioned near its center, further running at a right angle to the plane of support frame 28, is handle 16.

Figure 2:
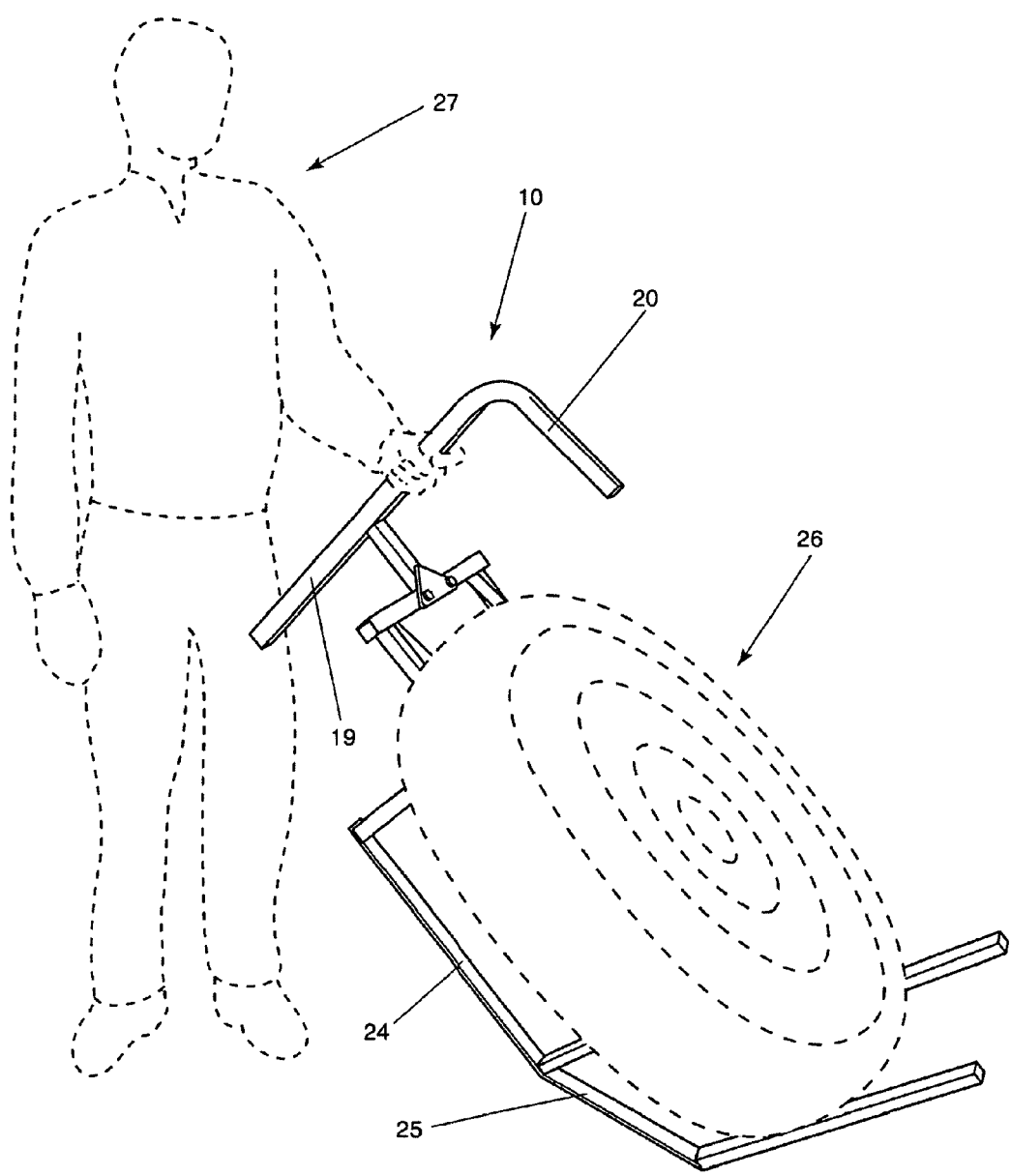
FIG. 2 is a perspective view drawing of the invention along with the tire and wheel assembly as the user would position it at the initial stage of lowering or raising the tire to the vertical or horizontal position.

Handle 16 is comprised of a connecting member 17 positioned on top of cross member 14 of support frame 28. Attached to connecting member 17 of handle 16 is handle cross member 18 running perpendicular to the plane of the top cross member 14 of support frame 28. Instead of a connecting member as shown, a weld or other known type of fastening method can be used. Handle cross member 18 is constructed so that a portion of it runs an appropriate and suitable length before it reaches the first stage portion 19 which the user can grip tire inflation stand 10 while lowering the tire and wheel assembly part way towards the horizontal position, as shown in FIG. 2. Handle 16 also has second stage portion 20, which is perpendicular to first stage portion 19 for gripping to lower tire stand 10 to a horizontal position.

The preferred tire stand 10 also has two fulcrum skids 21. These fulcrum skids 21 run substantially parallel to one another, running parallel to elongated elements 12 of support frame 28 and at a right angle to cross members 13, 14. Each fulcrum skid 21 has two ninety degree (90°) elevation members 22, 23 or risers running at an angle approximately ninety degrees (90°) from the aft side of elongated members 12 of support frame 28 and at a right angle to cross members 13, 14 of support frame 28. The length of elevation members 22, 23 is preferably selected to accommodate a preferred or predetermined working height. These fulcrum skids 21 are set apart from one another at a suitable distance to provide a stable base for the entire assembly of tire stand 10 when it rests in the horizontal position as shown in FIG. 4. Fulcrum skids 21 are of a length to adequately support tire stand 10 when in the horizontal position. Fulcrum skids 21 have lengthwise members 24 that are attached to elevation members 22, 23 and run parallel to the backside of elongated member 12 of the support frame to provide a footing for tire stand 10. Before reaching the bottom end of elongated members 12 of support frame 28, fulcrum skids 21 make an approximately forty-five degree (45°) return 25. Returns 25 are attached at the bottom of elongated members 12 of support frame 28 on its aft side near the lower cross member 13 of support frame 28. This forms the lower portion of the approximately forty-five degree (45°) elevation and fulcrum member of fulcrum skid 21. These approximate forty-five degree (45°) returns 25 of fulcrum skids 21 provide a middle point or stop for moving of the tire and wheel assembly from the vertical position to the horizontal position as illustrated in FIG. 2. This stop is advantageous to allow the user to adjust his grip to accommodate for the transferred load and to ease in the transition from a vertical position (FIG. 1) to a horizontal position (FIG. 4).

FIG. 2 is a perspective view of the preferred embodiment of tire stand 10 along with tire and wheel assembly 26 as user 27 lowers tire stand 10 to the forty-five degree (45°) interim position, on forty-five degree (45°) returns 25, before laying it in the complete horizontal position or raising it to the full vertical position. First user 27 grips first stage handle 19 moving tire stand 10 to the forty-five degree (45°) resting position on the forty-five degree (45°) returns 25 portion of fulcrum skids 21. In a second motion, the user grips second stage portion 20 and lower tire stand 10 all the way to the horizontal position resting tire stand 10 on lengthwise members 24 of skid fulcrums 21.

FIG. 4 is a side view of the preferred embodiment of tire stand 10 in the horizontal position illustrating the various elements of the device. Shallow arched radius members 15, self centering fork elements 11, elongated elements of the structural frame 12, handling enclosure 16, and fulcrum skids 21 are all adequately illustrated in this view.

Figure 3:
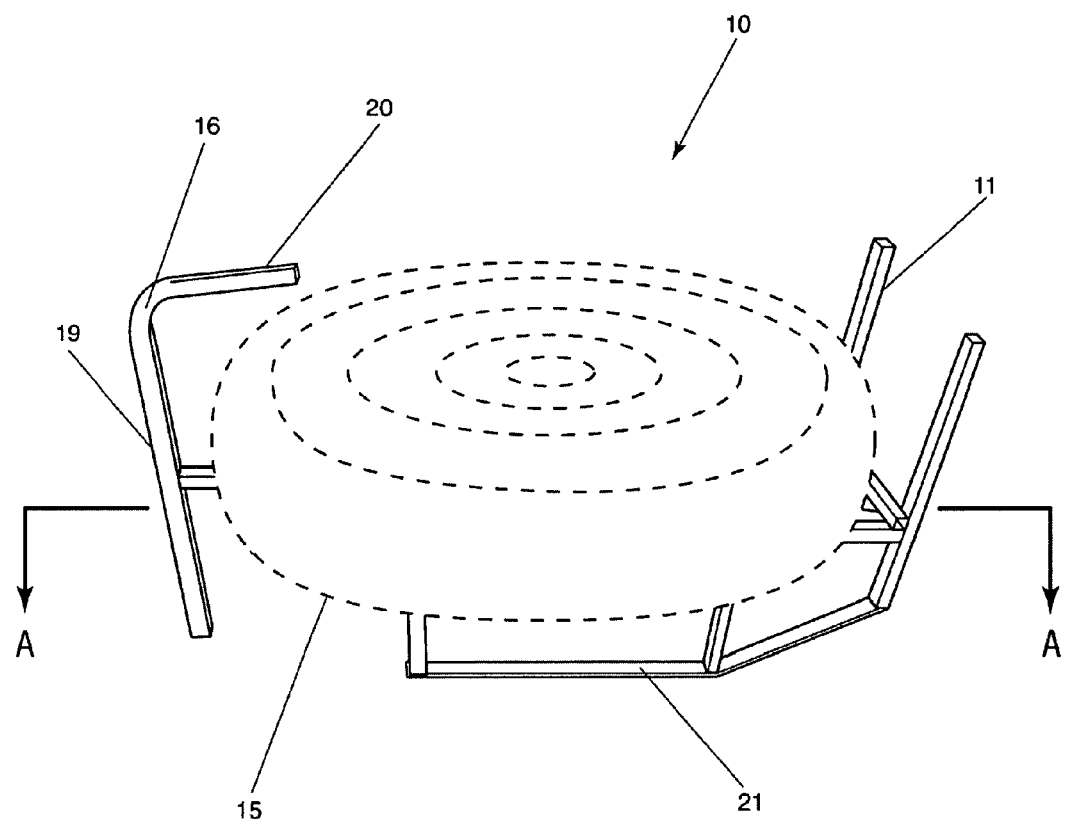
FIG. 3 is a perspective view drawing of the invention in the horizontal position with a tire and wheel in a working position.
Figure 5:
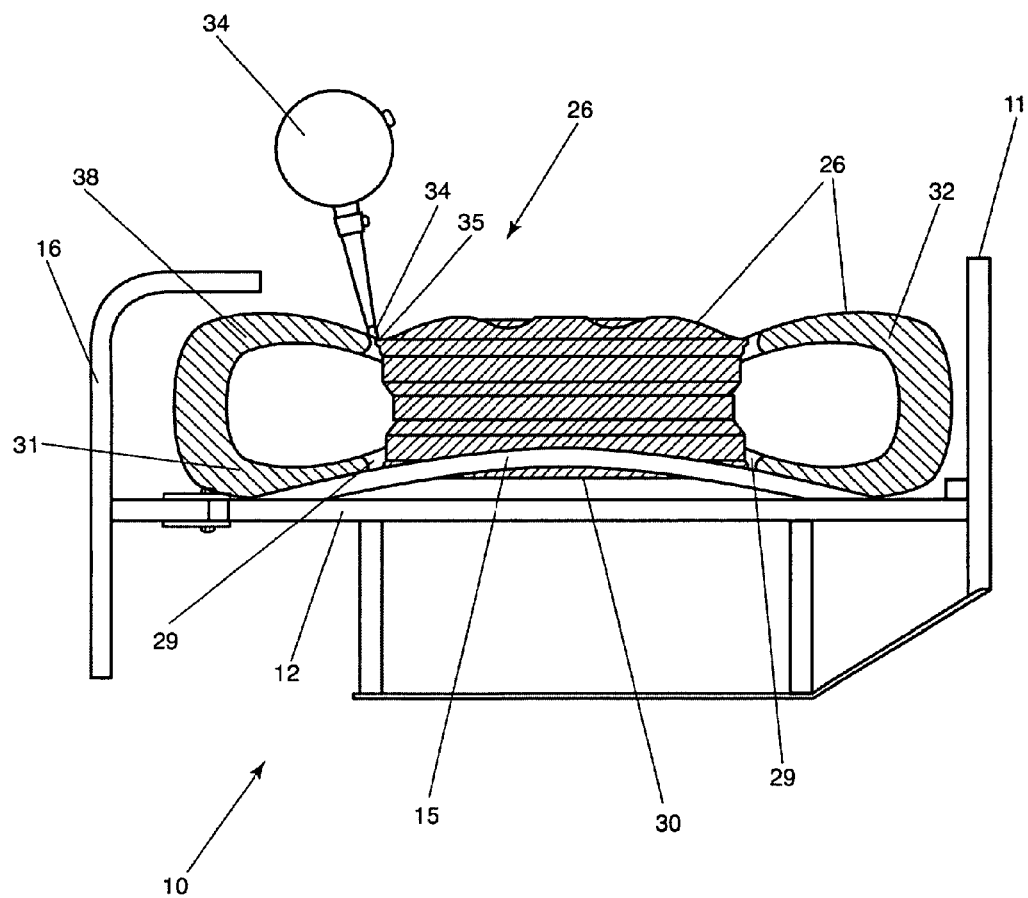
FIG. 5 is a right side view drawing of the invention along A-A of FIG. 3.

FIG. 5 is a side view of tire stand 10 with a cut away view along A-A of FIG. 3 showing tire and wheel assembly 26 in the horizontal position. This view clearly demonstrates the resting of tire and wheel assembly 26 on two shallow arched radius members 15. It also demonstrates the sealing of tire bead 29 against wheel rim 30 on the bottom portion of tire and wheel assembly 26 as a result of the inherent shape associated with shallowly arched radius members 15. It also demonstrates the additional vertical support by shallow arched radius member 15 of tire sidewall 31 as it rests thereupon. In addition, additional vertical sidewall support is provided by elongated elements 12, as shown. One can clearly see the relationship of fork element members 11 against the right side of tire face 32. Also illustrated is handle assembly 16 and second stage 20 which also serves as an enclosure for the tire and wheel assembly 26, positioned over the top left portion of the tire sidewall 38. Finally illustrated is bead seating device 34 positioned to force a volume of air between the top most portion of bead 34 and the top most portion of wheel rim 35.

Figure 6:
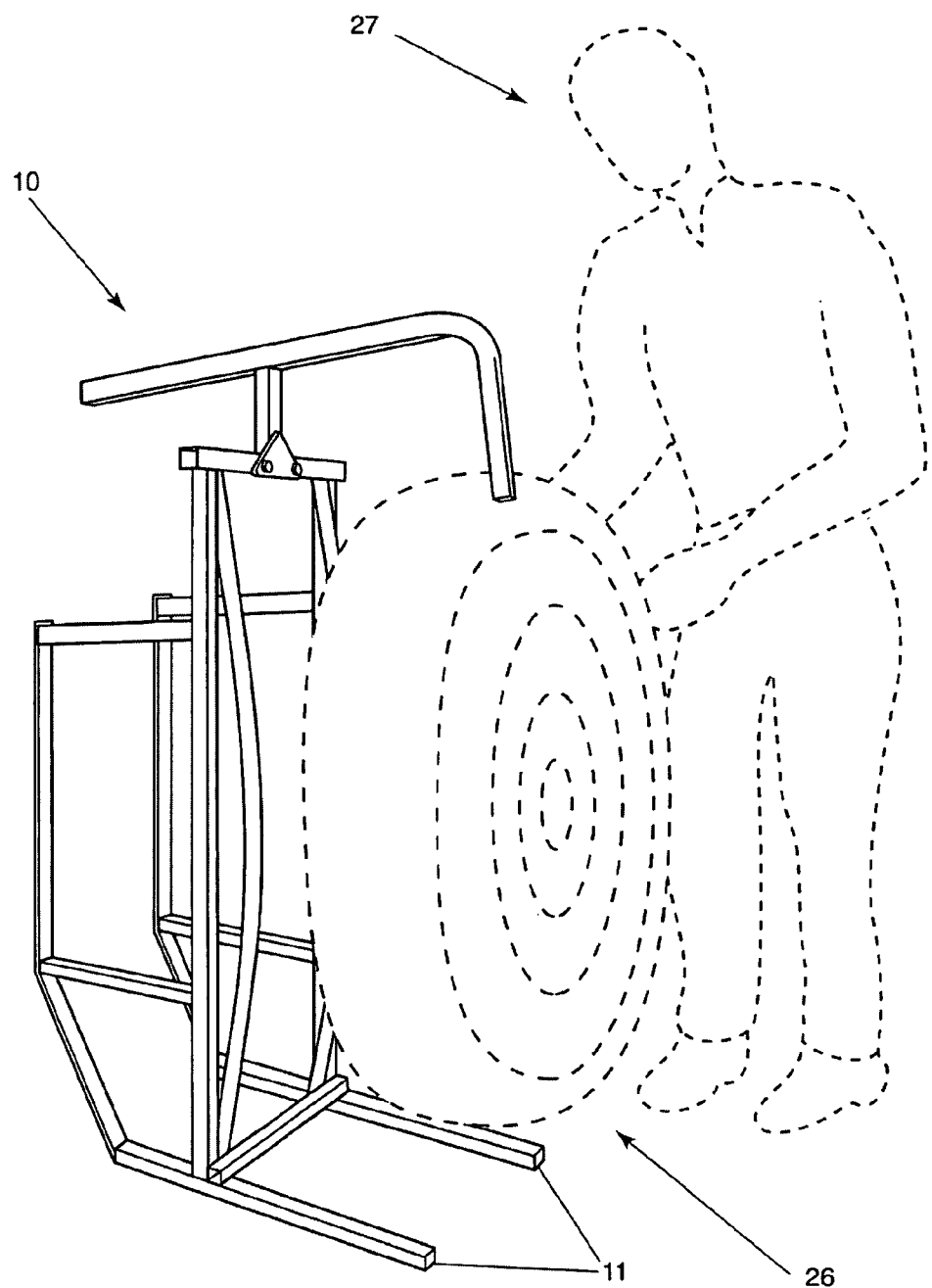
FIG. 6 is a perspective view of a user positioning a tire and wheel assembly on or off of the tire stand.

FIG. 6 illustrates a perspective view of user 27 positioning tire and wheel assembly 26 on or off of tire stand 10. As indicated, user 27 rolls tire and wheel assembly 26 on a parallel fashion with the structural plane 12, 13, 14 thereby positioning the radius portion of the wheel and tire assembly 26 between self centering fork element 11. User then will ensure that upper side walls 36 of tire and wheel assembly 26 are positioned to the inside of the enclosure element 20 and the enclosure assembly 16.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A tool for centering a tire on a wheel in preparation for seating a bottom bead of the tire on the wheel, the tool comprising:

a pair of substantially parallel extending fork elements configured to facilitate cradling a tire in an upright vertical rolling position;

a pair of substantially parallel elongated members each defining a proximal end and a distal end and being attached substantially perpendicular to a respective one of the extending fork elements at said distal end;

a pair of substantially parallel cross members running substantially perpendicular to the elongated members being attached to the two elongated members at said proximal and distal ends respectively;

at least two shallowly arched radius members running parallel to each other being attached at either end to a respective one of the cross members;

a handle being attached substantially perpendicular to a mid point of the cross member at said proximal end, the handle defining a cross portion, a first stage portion substantially perpendicular to the cross portion and a second stage portion substantially perpendicular to the first stage portion; and two fulcrum skids each having two elevation members running at substantially ninety degrees from the elongated members and at a right angle to the cross members, each of said skids having a lengthwise member attached to a respective one of the elevation members providing a footing for the tool and each further having an angled return portion attached to a respective one of the extending fork elements near the cross member at said distal end;

wherein said at least two shallowly arched radius members are configured to substantially center the tire and wheel by cradling an outer ring of the wheel on the at least two shallowly arched radius members when disposed horizontally on the at least two shallowly arched radius members whereby the gravitational pull on the tire and wheel onto the at least two shallowly arched radius members provides for concentric positioning of the bottom bead of the tire on the wheel.

2. The tool of claim 1 wherein said at least two shallowly arched radius members are configured to contact the outer ring of the wheel.

3. The tool of claim 1 wherein the at least two shallowly arched radius members provide vertical tire sidewall support.

4. The tool of claim 1 wherein the at least two shallowly arched radius members comprises a predetermined length to accommodate a specific range of tire and wheel sizes.

5. The tool of claim 1 wherein said two fulcrum skids provide two staged fulcrum skids, a first stage defined by the return portion and a second stage defined by the lengthwise member.

6. The tool of claim 1 wherein said two fulcrum skids comprise a predetermined vertical height.

7. A method for centering a tire on a wheel and for concentrically positioning a bottom bead of the tire on the wheel, the method comprising the steps of:

providing a tool comprising a pair of substantially parallel extending fork elements configured to facilitate cradling a tire in an upright vertical rolling position; a pair of substantially parallel elongated members each defining a proximal end and a distal end and being attached substantially perpendicular to a respective one of the extending fork elements at said distal end; a pair of substantially parallel cross members running substantially perpendicular to the elongated members being attached to the two elongated members at said proximal and distal ends respectively; at least two shallowly arched radius members running parallel to each other being attached at either end to a respective one of the cross members; a handle being attached substantially perpendicular to a mid point of the cross member at said proximal end, the handle defining a cross portion, a first stage portion substantially perpendicular to the cross portion and a second stage portion substantially perpendicular to the first stage portion; and two fulcrum skids each having two elevation members running at substantially ninety degrees from the elongated members and at a right angle to the cross members, each of said skids having a lengthwise member attached to a respective one of the elevation members providing a footing for the tool and each further having an angled return portion attached to a respective one of the extending fork elements near the cross member at said distal end; and horizontally disposing the tire and wheel on the at least two shallowly arched radius members, wherein the at least two shallowly arched radius members are configured to substantially center the tire and wheel when mounted on the at least two shallowly arched radius members whereby the gravitational pull on the tire and wheel onto the at least two shallowly arched radius members provides for concentric mounting positioning of the bottom bead of the tire on the wheel.

8. The method of claim 7 wherein the step of horizontally disposing comprises disposing a wheel outer ring on the at least two shallowly arched radius members.

9. The method of claim 7 wherein the step of providing a tool comprises providing vertical tire sidewall support via the at least two shallowly arched radius members.

10. A method for handling, positioning and assisting in concentrically seating a bead of a tire on a wheel, the method comprising the steps of:

providing a tool comprising a pair of substantially parallel extending fork elements configured to facilitate cradling a tire in an upright vertical rolling position; a pair of substantially parallel elongated members each defining a proximal end and a distal end and being attached substantially perpendicular to a respective one of the extending fork elements at said distal end; a pair of substantially parallel cross members running substantially perpendicular to the elongated members being attached to the two elongated members at said proximal and distal ends respectively; at least two shallowly arched radius members running parallel to each other being attached at either end to a respective one of the cross members; a handle being attached substantially perpendicular to a mid point of the cross member at said proximal end, the handle defining a cross portion, a first stage portion substantially perpendicular to the cross portion and a second stage portion substantially perpendicular to the first stage portion; and two fulcrum skids each having two elevation members running at substantially ninety degrees from the elongated members and at a right angle to the cross members, each of said skids having a lengthwise member attached to a respective one of the elevation members providing a footing for the tool and each further having an angled return portion attached to a respective one of the extending fork elements near the cross member at said distal end;

rolling a vertically oriented tire and wheel assembly onto the at least two shallowly arched radius members affixed to the tool;

tilting the tool from a vertical position to a horizontal position, whereby the wheel is in direct contact with the at least two shallowly arched members;

centering the tire and wheel assembly on the at least two shallowly arched radius members affixed to the tool by the gravitational pull on the tire and wheel onto the at least two shallowly arched radius members providing for concentric positioning of the bead of the tire on the wheel; and concentrically seating the bead of the tire on the wheel with a seating device.

11. The method of claim 10 where in the step of tilting comprise tilting the tire stand to a first stage comprising a predetermined angle between vertical an horizontal and tilting the tire stand to a second stage comprising the horizontal position.

12. The method of claim 10 wherein the step of centering comprises centering a wheel outer ring on the at least two shallowly arched radius members.

* * * * *